July 19, 1966 W. C. WEIK 3,261,265
FLUID MOTOR
Filed July 1, 1964 2 Sheets-Sheet 2
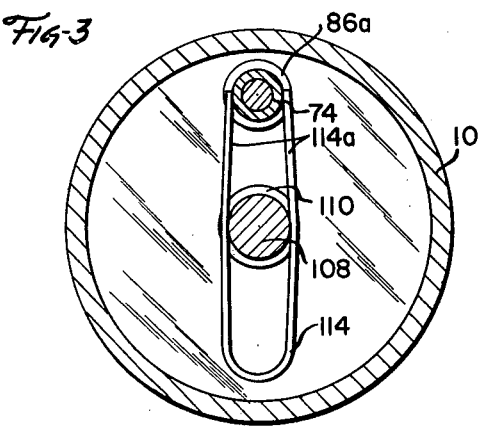
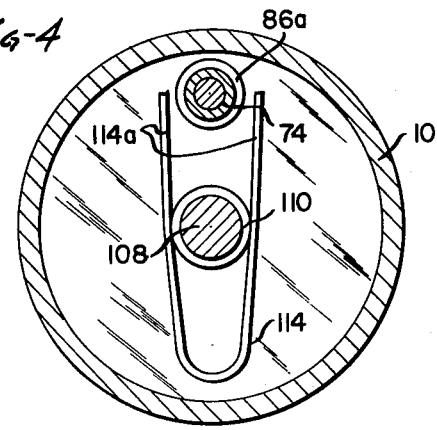
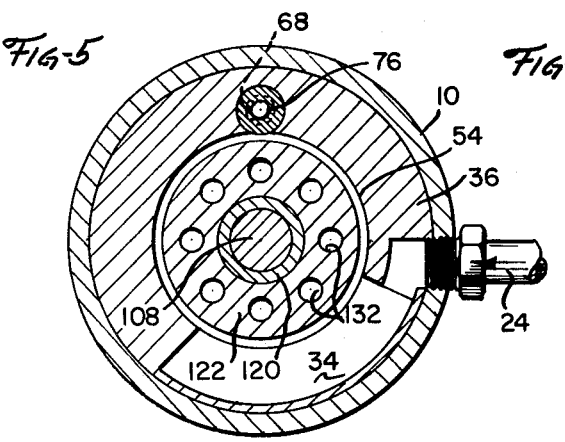
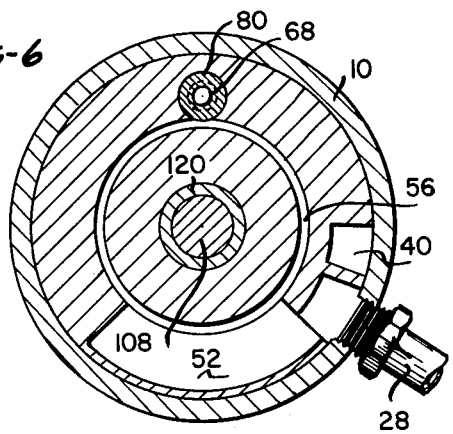
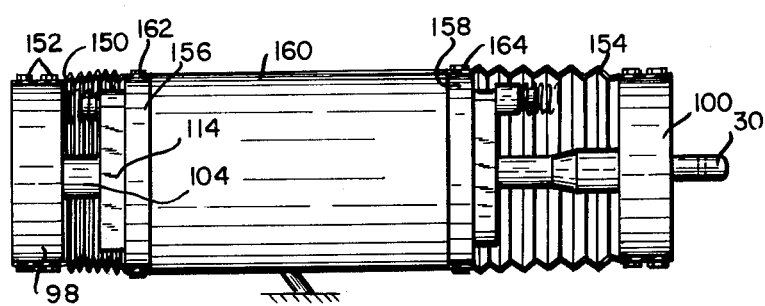
INVENTOR
WARREN C. WEIK
BY Nilsson, Robbins & Anderson
ATTORNEYS United States Patent Office 3,261,265
Patented July 19, 1966

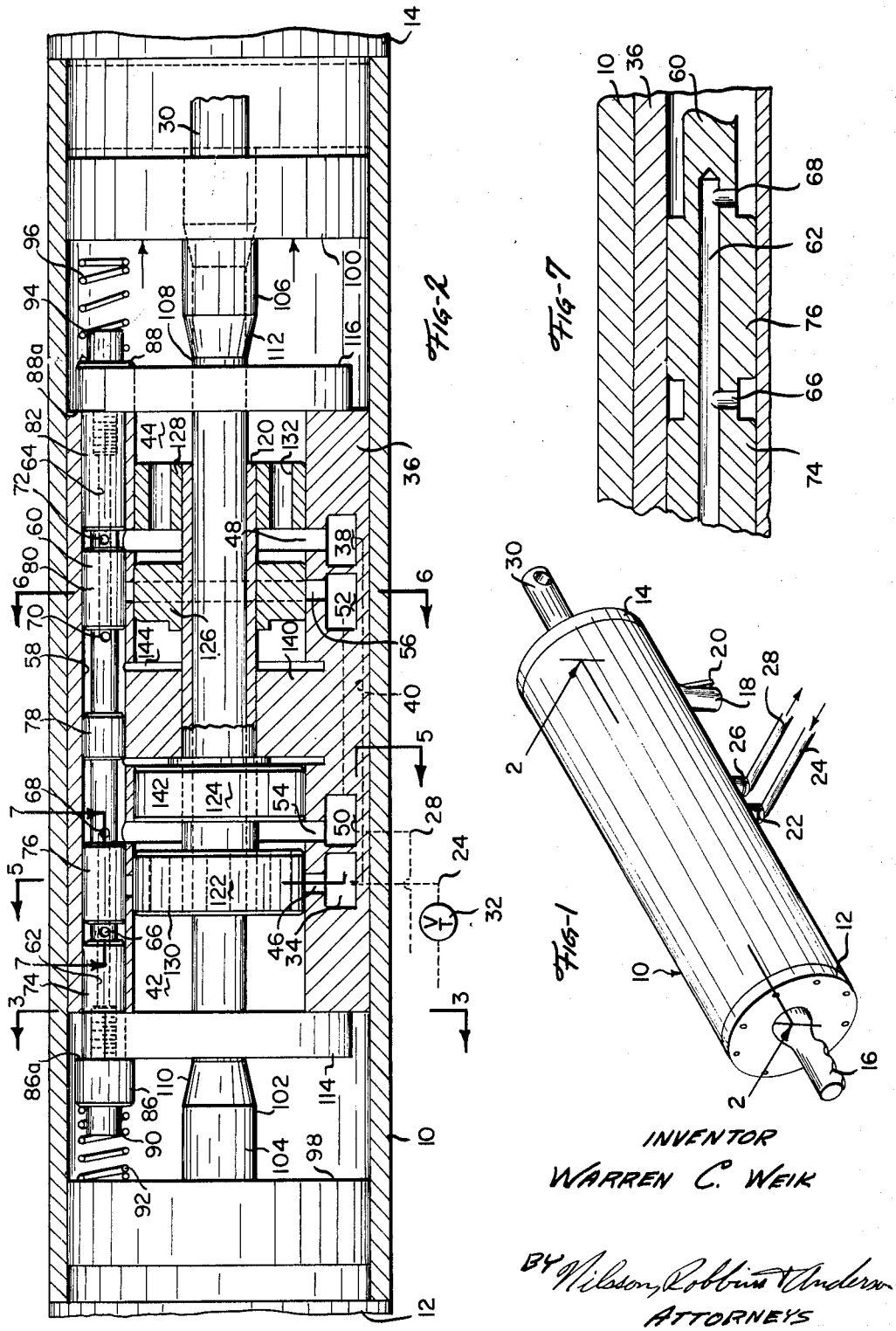

3,261,265
FLUID MOTOR
Warren C. Weik, 2500 N. 6th St., Burbank, Calif.
Filed July 1, 1964, Ser. No. 379,512
8 Claims. (Cl. 91—313)

The present invention relates to a fluid motor and particularly to a reciprocating motor for converting the flow of fluid across a pressure drop, into dynamic motive power.

The need often arises for motive power which, for reasons of safety or convenience is not driven by electricity or combustion fuel. For example, power hand tools employed in landscape maintenance which are driven by electricity or combustion fuel are sometimes inconvenient and perhaps, more important, dangerous. That is, these tools are often used in damp and wet areas with the result that electric power is a considerable hazard to the person using the tool. Also, combustion engines, as those using gasoline, are inconvenient in this application because of noxious fumes, control problems, noise, and the inconvenience and danger of handling explosive fuel. Of course, these and other problems associated with using such motive power often exist in various other applications.

However, pursuing the example of hand tools for landscape maintenance, water (under pressure) is normally available at sites where such tools are used. For example, water having a considerable static head may be provided for irrigation. The possibility therefore arises of using the energy of such water under pressure to drive various tools or other apparatus. Of course, the application of static head to drive large turbines is widely accepted practice which dates back a number of years. However, several particular problems arise in the application of such power to an economical apparatus of small size and which is capable of reasonable efficiency. For example, apparatus utilizing fluid pressure generally requires expenisve seals to avoid leakage. Also, in view of the pressures involved and the interrelationship of moving parts, excessive wear would normally be expected, and therefore considerable maintenance anticipated.

In addition to these considerations, certain problems are attendant prior known reciprocating hydraulic motors such as the need for generally expensive and complex valve structures, power capability limitations and relatively poor efficiency. Another problem encountered in prior reciprocating hydraulic motors has been their unreliability to start. That is, from certain operating positions, the motor may start by itself, while from others it may be balanced, in which condition fluid is discharged, but no motion is produced until an external force moves the reciprocating structure from "dead center." Therefore, in spite of a considerable need for an economical efficient and practical fluid motor, such motors have not come into widespread use in view of the disadvantages of prior structures.

An object of the present invention is to provide an improved reciprocating hydraulic motor which is relatively economical to manufacture and reasonably efficient in operation.

Another object of the present invention is to provide an improved hydraulic motor which is reliably self-starting, and which does not pass fluid unless operative.

Still another object of the present invention is to provide a hydraulic motor which may be embodied in a unit of relatively small size, yet which is capable of providing a practical level of motive power.

A further object of the present invention is to provide a reciprocating fluid motor incorporating one control valve which is variously positioned in accordance with the stage of operation of the motor and which serves to control another valve which determines the application of fluid pressure to the drive element for accomplishing reciprocating motive power.

Still a further object of the present invention is to provide an improved hydraulic motor wherein a mechanical timing structure functions in conjunction with a control valve to effectively control the application of fluid pressure to selected chambers internal the motor.

These and other objects and advantages of the present invention will become apparent from a consideration of the following taken in conjunction with the drawings, wherein:

FIGURE 1 is a perspective view of one form of motor constructed in accordance with the present invention;

FIGURE 2 is a vertical sectional view of the motor interior, taken along line 2—2 of FIGURE 1;

FIGURE 3 is a vertical sectional view taken along line 3—3 of FIGURE 2;

FIGURE 4 is a sectional view similar to FIGURE 3 showing the operating parts in other positions;

FIGURE 5 is a vertical sectional view taken along line 5—5 of FIGURE 2;

FIGURE 6 is a vertical sectional view taken along line 6—6 of FIGURE 2;

FIGURE 7 is a horizontal sectional view taken along line 7—7 of FIGURE 2; and

FIGURE 8 is a sectional view similar to FIGURE 2 showing a modified form of the structure.

Referring initially to FIGURE 1, the motor as shown has the general configuration of a cylinder 10. The ends of the cylinder 10 are closed by a rear cap 12 and a forward cap 14. A handle 16 extends concentrically from the rear cap 12 axial to the cylinder 10, and a transverse handle 18 extends radially from the bottom of the cylinder 10, mounting a control lever 20 which is connected to a throttle valve serving to regulate the flow of fluid into the cylinder 10. Fluid flow into the cylinder 10 is through an intake connection 22 served through a tube or hose 24 containing hydraulic power fluid as water, oil or various other liquids under pressure. Fluid is exhausted from the cylinder 10 through an exhaust connection 26 which receives an outlet tube or hose 28, having a low-pressure termination.

In the operation of the motor of FIGURE 1, actuating the lever 20 permits fluid to flow into the cylinder 10 through the connection 22 and out of the cylinder through the connection 26, which fluid flow results in a pressure drop, the energy from which reciprocates an actuator 30 relative the cylinder 10. The actuator 30 may therefore, be coupled to various tools and instruments to provide driving motive force. Of course, the possible uses for the motor are very great in number; however, some examples include hedge trimmer, lawn edger, pump drive, as well as a wide variety of rotary tools wherein the motor is used in conjunction with any of a variety of well known reciprocating-to-rotary motion converters.

In using the apparatus of FIGURE 1, the rate of fluid flow through the cylinder 10 is controlled by the lever 20 which is connected to a throttle valve 32 as shown in FIGURE 2. Generally, the degree to which the throttle valve 32 is opened controls the reciprocating rate of the actuator 30.

The throttle valve 32 passes fluid into an arcuate chamber 34 (FIGURES 2 and 5) in the wall of a cylinder 36 that is concentrically telescoped inside the cylinder 10. The arcuate chamber 34 is connected to another arcuate chamber 38 through a passage 40, all contained in the wall of the cylinder 36. As a result, the pressurized driving fluid actuates the system through the passage 40 and the chambers 34 and 38 as shown in FIGURE 2. The entries from the chambers 34 and 38 into the opposed cylindrical driving chambers 42 and 44 of the motor are annular ports 46 and 48 respectively.

The cylinder 36 also contains exhaust or discharge chambers 50 and 52 which are arcuate and communicate with the cylindrical drive chambers 42 and 44 respectively through annular ports 54 and 56. In this regard, it is to be noted that the annular ports provide a large-area passage, which enables a large volume of fluid to be passed in and out of the drive chambers during a short interval of time. This feature of the structure is considerable advantage to effective operation.

In addition to the passages described above, the internal cylinder 36 also contains an elongate bore 58 in which a compound slider valve 60 operates. The operation of the slider valve 60 is described in detail below to control the fluid intake and discharge valving structure in accordance with the state of operation of the motor.

The slider valve 60 is formed into grooves and lands and contains concentric internal bores 62 and 64 adjacent the ends thereof. The bore 62 is open through transverse ports 66 and 68 (FIGURES 2 and 7) while the bore 64 is open through transverse ports 70 and 72 (FIGURE 2). The port 66 lies between valve lands 74 and 76, while the port 68 lies between the land 76 and a central bearing land 78. Similar lands are provided on the other side of the spool valve 60, i.e., a land 80 between the ports 70 and 72 and an end land 82.

The ends of the spool valve 60 extend to the ends of the elongate bore 58 in the containing cylinder 36. The bores 62 and 64 into the ends of the valve 60 are closed by threadably-received caps 86 and 88 respectively. Cap 86 carries a cylindrical stud 90 which is concentric with the spool valve 60 and supports a coil spring 92. In a similar fashion, the cap 88 has an integrally formed stud 94 upon which a coil spring 96 is mounted. The springs 92 and 96, during certain phases of operation abut the drive pistons 98 and 100 and are thereby compressed on the studs 90 and 94 respectively. The forces of the springs 92 and 96 along with other structure as described below, position the spool valve 60 in accordance with the current state of operation. The spool valve then positions a secondary valve that controls the flow of fluid in and out of the drive cylinder chambers 42 and 44.

The drive pistons 98 and 100 in the drive chambers are interconnected by an elongated shaft 102 that is concentrically positioned within the cylinders 10 and 36. The cylindrical end sections of the shaft 104 and 106 are of larger diameter than the central section 108. An internal taper is therefore formed between each of these sections. Specifically, a taper 110 lies between the sections 102 and 108 while a taper 112 lies between the sections 108 and 106. These tapered surfaces serve as control cams to position a pair of U-shaped springs 114 and 116 as shown in FIGURES 3 and 4 to alternately lock the valve 60 against movement in either direction. The upper ends 114a and 116a of the springs 114 and 116 alternately engage internal shoulders 86a and 88a between the caps 86 and 88 and the spool valve 60 to lock the valve. That is, when an enlarged end section, e.g., section 104 of the shaft 102 is between one of the U-shaped springs, e.g. spring 114, the ends 114a of the spring are spread permitting free movement of the spool valve 60. However, when the smaller-diameter section 108, for example, of the shaft 102 is within the U-shaped spring 114, the ends of the spring can move inward engaging an end of the spool valve 60 and abutting against the internal shoulder 86a formed therebetween with an end cap, e.g. cap 86. As a result, the spool valve 60 is locked against movement in one direction (to the right) regardless of the force applied thereto by the springs 92. The operation of the U-shaped spring 116 to lock the valve 60 against movement to the left during alternate half cycles is similar.

The central section 108 of the center shaft 102 passes through an interior valve sleeve and disks which are contained in the cylindrical chambers 42 and 44. Specifically, the shaft section 108 passes telescopically through an elongate sleeve or cylinder 120 in freely-sliding relationship therewith. Fixed on the outside of the cylinder 120 are four disks or lands 122, 124, 126 and 128. The land 122 is affixed at one end of the cylinder 120 within the cylindrical chamber 42 so as to operate in cooperation with the annular port 46. It is to be noted, that the land 122 contains ports 130 parallel its axis, with the result that it does not divide fluid in the cylindrical chamber 42.

At the other end of the sleeve or cylinder 120, the open land 128 containing ports 132 is fixed in position to operate with annular port 48. Mounted inside the lands 122 and 128 on the cylinder 120 are the closed lands 124 and 126, which function in cooperation with annular ports 54 and 56 respectively. It is to be noted, that the cylinder 20, along with the central shaft 102, is supported by a central divider 140 which may be integrally formed in the cylinder 36, and which lies between ports 142 and 144 entering the bore 58 from the cylindrical chambers 42 and 44 respectively.

In considering the operation of the system, an explanation can now best be accomplished by assuming an initial stage of operation or position as shown in FIGURE 2 and describing the sequence of events which follow during a normal cycle of reciprocal motion.

As shown in FIGURE 2, the sleeve cylinder 120 along with the lands 122, 124, 126 and 128 is displaced to the right so that the land 130 closes the annular port 46 while the land 126 closes the annular port 56. Therefore, fluid may flow from the throttle valve 32 through the cavity 38 and the annular port 48 into the cylindrical chamber 44. This fluid passes through the ports 132 in the land 120, applying an expansive force to the piston 100 and driving the piston 100 along with the shaft 102 and the piston 98 to the right, as indicated in phantom.

During the stroke to the right, as described above, the left drive piston 98 moves to the right with the result that fluid contained in the cylindrical chamber 42 must be provided an exhaust path. The fluid so contained flows from the annular port 54 to the arcuate discharge chamber 50, then through the exhaust outlet. In this manner, fluid is received in the cylindrical drive chamber 44 and exhausted from the cylindrical drive chamber 42. It is to be noted, that during the stroke toward the right, both the valving structure of the spool valve 60 and that of sleeve cylinder 120 are immovable. The large internal valve of the cylinder 120 remains fixed because the hydraulic forces applied thereto are balanced. Specifically, the exterior lands 122 and 128 are ported and therefore cannot provide the motivating force from fluid pressure, and the pressure applied to land 126 are balanced through the spool valve 60. That is, the annular port 48 is communication with the port 72, the bore 64 and the port 70, so that hydraulic fluid pressure on the exterior surface of the land 126 is balanced by hydraulic pressure applied to the interior surface through the spool valve 60. In a similar manner, the surfaces of the land 124 received a balanced fluid pressure through the annular port 54, the space between the lands 76 and 78, and the port 142. Therefore, the rigidly interconnected lands 122, 124, 126 and 128 and the sleeve cylinder 120 remain fixed.

During the phase of operation described above, in which the pistons 98 and 100 along with the shaft 102 are driven to the right, the piston 98 engages the coil spring 92 compressing the same to exert a force on the end cap 86 of the spool valve 60. However, the force applied to the spool valve 60 by the spring 92 accomplishes no movement when initiated because the U-shaped spring 114 dwells under the cap 86 locking it against movement to the right by the force applied through spring 92. Therefore, the spool valve 60 remains in position.

As the shaft 102 along with the pistons 98 and 100 approaches the end of its stroke, the cam surface 110 moves between the U-shaped spring 114 spreading the ends of the spring (FIGURE 4) sufficiently to permit the spring 92 to snap the spool valve 60 to the right seating the cap 86 against the internal cylinder 36.

Upon such occurrence, the former pressure-equalizing passage about the land 126 is closed. That is, the ports 70 and 72 entering the bore 64 are displaced to the right so that the port 48 is closed by the land 80 while the port 70 lies above the annular port 56 which is now closed by the land 126. As a result of this change, the hydraulic pressure across the land 126 is no longer balanced, and as the right drive piston 100 reaches the end of its stroke, the pressure within the cylindrical chamber 44 increases resulting in an increased force applied to the right side of the land 126 which drives the entire unitary central valving structure to the left reversing the position in which the elements thereof are shown in FIGURE 2. It is to be noted, that during such motion by the land 126 and its associated elements, the fluid between the land 126 and the central divider 140 passes from the port 144 through the exhaust port 56 to accommodate the movement.

With the movements thus described, the position of the control valves is reversed from that shown in FIGURE 2. That is, the spool valve 60 is displaced to the right, with the U-shaped spring 116 locking it against movement to the left, while the central valve structure is displaced to the left so as to balance the forces applied across the land 124 through the ports 66 and 68 of the spool valve 60. During this phase of operation, the cylindrical chamber 42 receives drive fluid through the arcuate chamber 34 and the annular port 46 to urge the piston 98 to the left. Exhaust fluid from the right side of the motor leaving the cylindrical chamber 44 is passed through the annular port 56 and the arcuate chamber 52 to be discharged.

Under control of these valve positions, the stroke toward the left continues, with the result that the drive piston 100 compresses the coil spring 96, applying a force to the spool valve 60; however, the valving elements remain fixed until the pistons reach the end of their stroke. At such time, the U-shaped spring 116 is opened as described above, permitting the spool valve 60 to return to the position as shown in FIGURE 2 (shift to the left). With the movement by the spool valve 60 to the left, the pressure across the land 124 is no longer balanced through the bore 62, and the land receives a force to drive the sleeve cylinder 120 to the right, to the position shown in FIGURE 2. Thus, the cycle is complete. It is important to note, that fluid flow in the system across the pressure drop always serves to drive the motor. That is, there is no state in which the motor passes fluid which does not accomplish useful work.

Another important feature of the motor described herein, resides in the consideration that only two dynamic seals are required in the entire motor. As a result, wear of the parts is relatively small permitting maintenance-free operation over extended intervals.

One other important aspect of the motor is that it may be manufactured relatively inexpensively. For example, excluding the springs in the system, the entire structure may be formed of cast and machined plastic parts. Of course, metals or other materials may also be used to provide a more rigid structure or alternatively a combination of materials may be employed. In this regard further, it is to be noted that the assembly operation of the system is relatively simple and also may be economically accomplished.

As indicated above, a small number of dynamic seals results in a considerable advantage to the present system; however, the system may also be constructed in a modified form as shown in FIGURE 8, with no dynamic seals. FIGURE 8 shows a sectional view similar the view of FIGURE 2; however, without the central portion of the motor sectioned to show working parts previously described. In the system of FIGURE 8, the piston 98 is contained at the end of a bellows unit 150 and affixed therein by bolts 152. In a similar manner the piston 100 is affixed in the end of the bellows 154 at the right end of the motor. The internal ends of the bellows 150 and 154 telescopically receive sections 156 and 158 of a cylinder 160 (similar the cylinder 10) and are affixed to the cylinder by bolts 162 and 164 respectively.

In the system as shown in FIGURE 8, the operation is similar to that previously described; however, the movement of the pistons 98 and 100 is accommodated by expansion and contraction of the bellows 150 and 154 respectively so that the system reciprocates relative the cylinder 160 and provides a drive force at the actuator 30 which may be variously utilized as indicated above.

In general, the motor as shown in FIGURE 8 is normally feasible in a rather limited-length stroke application in view of the difficulty of making and maintaining long bellows. However, the system as shown in FIGURE 2 lends itself in a practical manner, to exceedingly long stroke embodiments. Of course, this consideration is possible in view of the static nature of the valve controlling elements except during an actual stroke reversal.

Several important features of the invention have been pointed out in some detail above; however, various other important features will become readily apparent to one skilled in the art. Furthermore, modifications and variations of this system will also appear to one skilled in the art; however, in this regard, the scope of the invention is not to be limited to the embodiments described and suggested herein, but rather shall be defined by the appended claims.

What is claimed is:

1. A fluid motor, as for driving a load with energy from a source of pressurized fluid, comprising:
    a motor body defining first and second ported cylindrical cavities therein;
    a first drive piston contained in said first cavity and a second drive piston contained in said second cavity;
    means mechanically interconnecting said first and said second drive pistons;
    a first valve means cooperating with said first ported cavity to alternately pressurize said first ported cavity from said source and relieve said first ported cavity, positioned in said first ported cavity and including a first control piston for motivating said first valve means;
    a second valve means cooperating with said second ported cavity to alternately pressurize said second ported cavity from said source and relieve said second ported cavity; positioned in said second ported cavity and including a second control piston for motivating said second drive means;
    means interconnected said first and second valve means in reversed relationship; and
    a control valve means for alternately by-passing one of said control pistons in accordance with the movement of said drive pistons whereby to reciprocate said drive pistons and including:
        a slider valve means for by-passing said control pistons, a spring means to translate movement of said drive pistons into a force on said slider valve; and lock means to lock said slider valve in two stable positions under control of said drive pistons.

2. A fluid motor according to claim 1 wherein said lock means comprises: a U-shaped spring mounted to close on said slider valve to lock said slider valve; and a cam surface affixed to said drive pistons for spreading said U-shaped spring to release said slider valve.

3. A fluid motor according to claim 1 wherein said first and second valve means comprise lands slidably affixed on said means mechanically interconnecting said first and second drive pistons.

4. A fluid motor according to claim 3 wherein said means mechanically interconnecting said first and second drive pistons comprises a rod coaxial with said pistons, and wherein said lands slide on said rod and are coaxial thereto.

5. A fluid motor, as for driving a load in a reciprocating manner, with energy from a source of pressurized fluid, comprising:
- a motor body, defining a plurality of cavities;
- a drive piston slidably mounted in each of said cylindrical cavities and having two sides;
- a connecting rod connected to each of said drive pistons and adapted to be connected to said load;
- interior valve sleeve means positioned in each of said cylindrical cavities and settable in two operating positions to control application of pressure from said source, and relief therefrom to at least two sides of said drive pistons, alternately in said two operating positions thereof; and
- means for moving said interior valve sleeve means from one operating position thereof to the other at the end of a stroke by said connecting rod.

6. A fluid motor, as for driving a load in a reciprocating manner, with energy from a source of pressurized fluid, comprising:
- a motor body, defining a plurality of cavities;
- a drive piston slidably mounted in each of said cylindrical cavities and having two sides;
- a connecting rod connected to each of said drive pistons and adapted to be connected to said load;
- interior valve sleeve means positioned concentrically in each of said cylindrical cavities and slidably supported on said connecting rod, said valve sleeve means in each of said cavities movable between two operating positions to control the application of pressure from said source and the relief therefrom to at least two sides of said drive pistons; and
- control means for moving said interior valve sleeve means in synchronized phase whereby to alternately pressure and relieve opposing sides of said drive pistons whereby to reciprocate said connecting rod, said control means acting at the end of each stroke by said connecting rod.

7. A fluid motor, as for driving a load in a reciprocating manner, with energy from a source of pressurized fluid, comprising:
- a motor body defining two coaxially-aligned cylindrical cavities;
- a drive piston mounted in each of said cylindrical cavities;
- a connecting rod interconnecting said drive pistons and adapted to be connected to said load;
- interior valve sleeve means positioned in each of said cylindrical cavities and settable in two operating positions to control application of pressure from said source, and relief therefrom to at least two sides of said drive pistons, alternately in said two operating positions therof; and
- control means for moving said interior valve sleeve means in synchronized phase whereby to alternately pressure and relieve opposing sides of said drive pistons whereby to reciprocate said connecting rod, said control means acting at the end of each stroke by said connecting rod.

8. A fluid motor, as for driving a load in a reciprocating manner, with energy from a source of pressurized fluid, comprising:
- a motor body defining two coaxially-aligned cylindrical cavities;
- a drive piston mounted in each of said cylindrical cavities;
- a connecting rod interconnecting said drive pistons and adapted to be connected to said load;
- interior valve sleeve means positioned concentrically in each of said cylindrical cavities and slidably supported on said connecting rod, said valve sleeve means in each of said cavities moxable between two operating positions to control the application of pressure from said source and the relief therefrom to at least two sides of said drive pistons; and
- control means for moving said interior valve sleeve means in synchronized phase whereby to alternately pressure and relieve opposing sides of said drive pistons whereby to reciprocate said connecting rod, said control means acting at the end of each stroke by said connecting rod.

References Cited by the Examiner

UNITED STATES PATENTS

| | | | |
|---|---|---|---|
| 1,704,641 | 3/1929 | Weed | 91—313 |
| 2,239,727 | 4/1941 | Mayer | 91—313 |
| 2,331,108 | 10/1943 | Ganahl | 91—358 |
| 2,361,757 | 10/1944 | Fink | 91—313 |

SAMUEL LEVINE, *Primary Examiner.*

P. E. MASLOUSKY, *Assistant Examiner.*